United States Patent [19]

Rosensweig

[11] Patent Number: 5,396,817
[45] Date of Patent: Mar. 14, 1995

[54] TIRE INFLATION AND VELOCITY SENSOR

[75] Inventor: Ronald E. Rosensweig, Summit, N.J.

[73] Assignee: Exxon Research and Engineering Co., Florham Park, N.J.

[21] Appl. No.: 799,791

[22] Filed: Nov. 29, 1991

[51] Int. Cl.6 ............................................. G01M 17/02
[52] U.S. Cl. ............................................ 73/146.2
[58] Field of Search .................................. 73/146.2

[56] References Cited

U.S. PATENT DOCUMENTS

| | | | |
|---|---|---|---|
| 3,478,582 | 11/1969 | Hough | 73/146.2 |
| 4,084,431 | 4/1978 | Newby | 73/146.2 |
| 4,355,299 | 10/1982 | Cook, Jr. | 73/146.2 |
| 4,630,470 | 12/1986 | Brooke et al. | 73/146.2 |

FOREIGN PATENT DOCUMENTS 1394091  5/1988  U.S.S.R. ................. 73/146

Primary Examiner—Richard E. Chilcot, Jr.
Attorney, Agent, or Firm—Ronald D. Hantman

[57] ABSTRACT

A system that will indicate tire inflation and vehicle velocity. An array of strain gage sensors is used to determine the distribution of contact forces along the width of a pneumatic tire. A neural network may be employed to classify the patterns of force sensed in this manner. Additional processing of the data permits vehicle velocity to also be determined.

16 Claims, 11 Drawing Sheets

OVERINFLATED

NUDERINFLATED

TIRE INFLATION AND VELOCITY SENSOR

BACKGROUND OF THE INVENTION

The present invention is a system for determining pressure of a pneumatic tire mounted on a vehicle. Another objective is to determine the degree of road contact of a tire as a guide to determining appropriate tire pressure. The same system measures vehicle velocity.

Pneumatic tires for carrying vehicles should be maintained at the proper pressure in order to achieve optimum conditions for either safety, comfort, road handling, fuel economy, and longer tire wear, or combinations thereof.

An under-inflated tire primarily bears its load at the shoulders of the tread, in which case its road-engagement pattern is somewhat concave between those shoulders. Under such conditions continued use of the tire over the road causes excessive wear at the shoulders, because an appropriate frictional contact in the central portion is not maintained. This results in less than normal lifetime and obviously uneven wear. Alternatively, an over-inflated tire sustains considerable wear in the central tread area between the shoulders, and less-than-normal wear at the shoulder portions. Either situation results in wastefulness, since the total potential of the tire is not being used. In other instances, there is a greater tendency to skid or slide. In addition, undue stresses and strains, particularly in the instance of under-inflation, are applied to the sidewalls of the tire carcass, causing it to deteriorate before its time.

Tire manufacturers provide specifications for the operation of tires. Automobile manufacturers also specify tire inflation characteristics. However, both of these specifications, even if followed religiously, do not necessarily mean that the tire-operating condition is particularly correct for that tire on that vehicle. The ideal conditions, therefore, will be seen to exist when the air pressure in the particular tire is just sufficient to produce full road-engagement contact across the entire width of the tread, so that the weight of the car is borne equally in the road-engagement area between the shoulders and across the central portion of the tire. Under such circumstances the tire tread will wear evenly, and the tread life and maximum safety results from maximum gripping or friction of the tire on the roadway.

In the past, vehicle operators or gas station attendants have to some degree relied on visual inspection of the tire under a load to appraise inflation. A tire wearing too much at the shoulders becomes bald therearound due to the under-inflation of the tire. However, when the bald condition is visible or observable, it may already be too late to do much to rectify the situation. Contrariwise, the over-inflated tire bears the load in the mid-portion of the tread where wear rapidly occurs due to the fact that the share of the load being borne by the particular tire is distributed over too small a central road-engagement area at the tread, whereupon a bald strip soon appears around the casing. When such a situation is to be appraised visually, there is likely to have been such excessive mid-tread wear that the casing may have nearly lived out its operating life. Of course, such determinations are affected by differences in the load borne by a tire. For example, where a vehicle is operated normally with a driver and one passenger, one condition exists. When it is caused to bear two or three extra passengers and, possibly, luggage and other loads, the conditions change markedly, and an adjustment in tire pressure should be made.

Alternatively, the operator of a vehicle may desire a softer more cushioned ride attendant to under-inflation. Or the operator may desire to over-inflate the tires to achieve more responsive steering and increased fuel economy in operating the vehicle. This invention provides a means to indicate any inflation condition.

In the prior art the U.S. Pat. No. 3,973,436 (Aug. 10, 1976) of G. H. Lenderman discloses a tire inflation appraisal apparatus consisting of a linear array of spring loaded lever arms proposed to detect and amplify the profile shape of a tire resting on the array. An operator is required outside the vehicle to observe the visual pattern formed by the ends of the tilted levers. The present invention yields several improvements over the Lenderman concept: the data can be acquired whether the vehicle is in motion or not; the sensing means is more accurate; human involvement and judgmnent are not required; the raw data is collected as electrical signals which are well suited for data processing and extraction of informational content using a digital computer; advanced pattern recognition methodology can be employed, e.g., a neural network that can be conveniently trained and used to interpret the readings. Vehicle velocity can be measured concomitantly with tire inflation. The display of the read out pattern is more convenient, e.g., as graphic and alphanumerics on a computer driven display screen or as a printed report. The data processing feature of this invention is particularly important as the pattern generated by the raw data is often complex and its meaning recondite.

SUMMARY OF THE PRESENT INVENTION

The present invention is a system that will indicate the pressure of a pneumatic tire conveniently and quickly. Another objective is to determine the goodness of road contact. Vehicle velocity can also be detected and indicated. The system includes an array of load sensors that provides a pattern of the force distribution exerted by the tire, e.g., a linear array of sensors in contact with the tire along a line across the width of the tire. The force distribution is analyzed by a computer which is programmed to determine the tire pressure. The analysis is substantially independent of the make or model of the tire or vehicle. The determined pressure is then displayed, for example, on a screen or in printed form. The screen may be electronic such as a cathode ray tube.

The tire pressure may be determined by the system of the present invention by a decomposition method (see Example 3). The tire pressure may also be determined by an analysis technique referred to as pseudopressure (see Example 4). Finally, the tire pressure may be determined by the system using neural networks (see Examples 5 and 6).

BRIEF DESCRIPTION OF THE FIGURES

FIG. 2(*b*) shows a cross-sectional view of the load sensors of FIG. 2(*a*).

FIG. 3(*a*) shows overinflation and FIG. 3(*b*) shows underinflation.

FIGS. 7(a-c) show the dynamically acquired tire-footprint-forces with tire pressure of 29 psi (Mercury Topaz).

FIGS. 8(a-c) show a dynamically acquired tire-footprint-forces with tire pressure of 25 psi (Mercury Topaz).

DESCRIPTION OF THE PREFERRED EMBODIMENT

The present invention is a system for measuring tire pressure. The system is non-intrusive and functions substantially independent of make and model of the tire and vehicle.

The problem may be described as follows. The tire provides input to the sensors which provide data to the computer which processes the data to provide an output pressure. Although the data may be imperfect (as will be explained below), a reliable output is desired. The present system closely achieves that reliable output.

Figure 1:
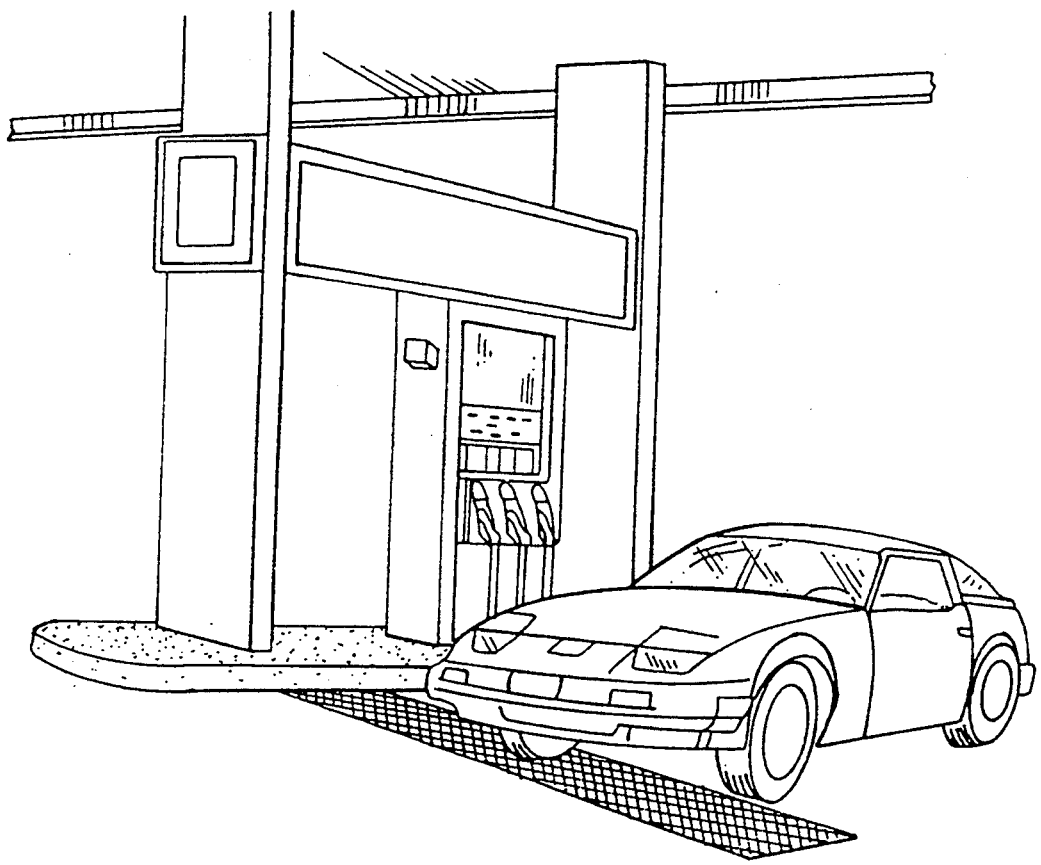
FIG. 1 shows a tire sensor for the driveway.

The present system will preferably be operated on the premises of a gasoline service station, e.g., in a driveway adjacent to a gasoline service pump. The sensors will typically be located in the driveway area (FIG. 1). The sensors may be embedded in the driveway (FIG. 2). Using flat detectors such as piezoelectric or piezoresistive polymer film the sensors may be embedded in a thin mat.

Figure 2A:
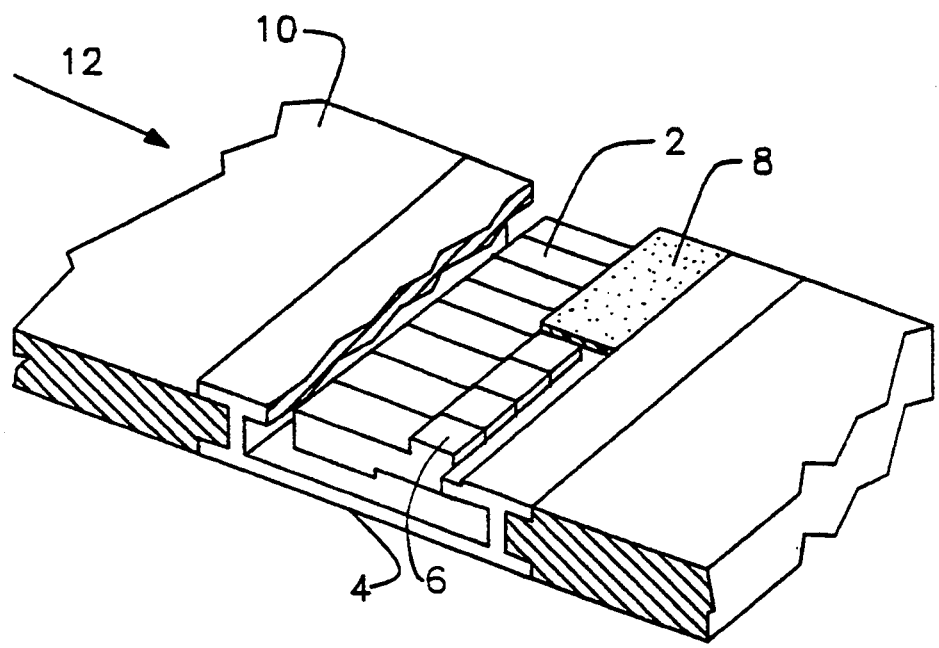
FIG. 2(*a*) shows a perspective view of an experimental linear array of load cell sensors.
Figure 2B:
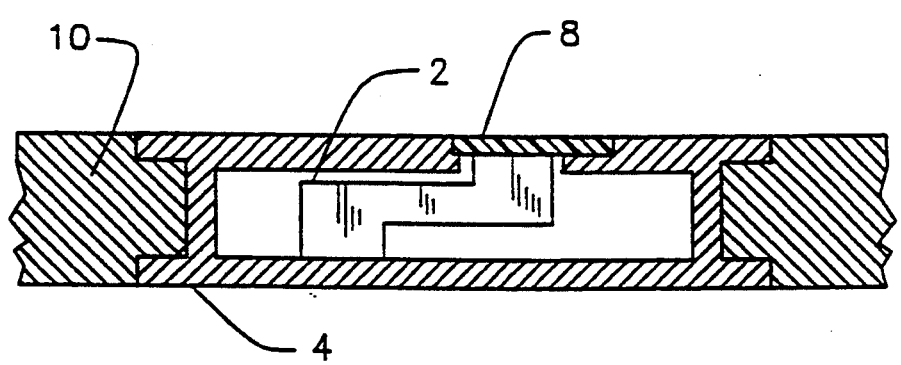

FIGS. 2A and 2B show diagrams of the sensors embedded in the driveway. FIG. 2A is a perspective view and FIG. 2B is a cross-sectional view. The sensors 2 are located in a pit liner 4 embedded in the driveway 10. The sensitive area 6 of the sensors 2 is covered by an elastomeric layer 8. The vehicle motion is in the direction of the arrow 12.

Figure 3A:
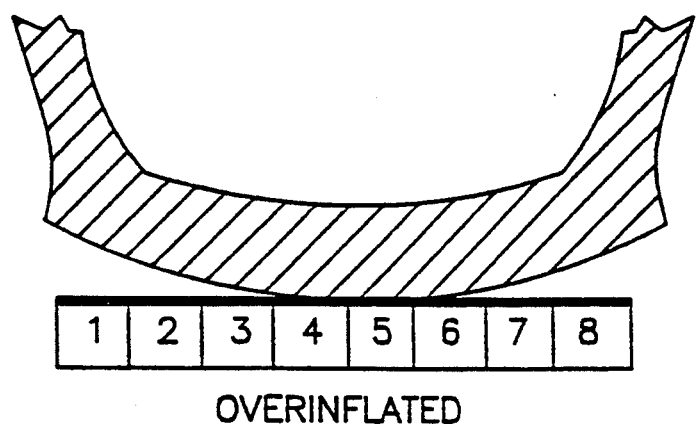
FIG. 3 shows how tire shape and contact pressure are related to tire inflation pressure.
Figure 3B:
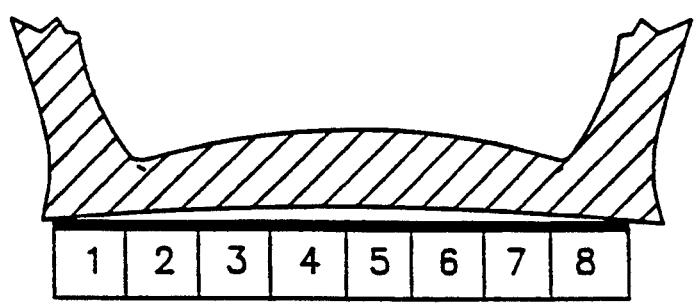
Figures 4A, 4B:
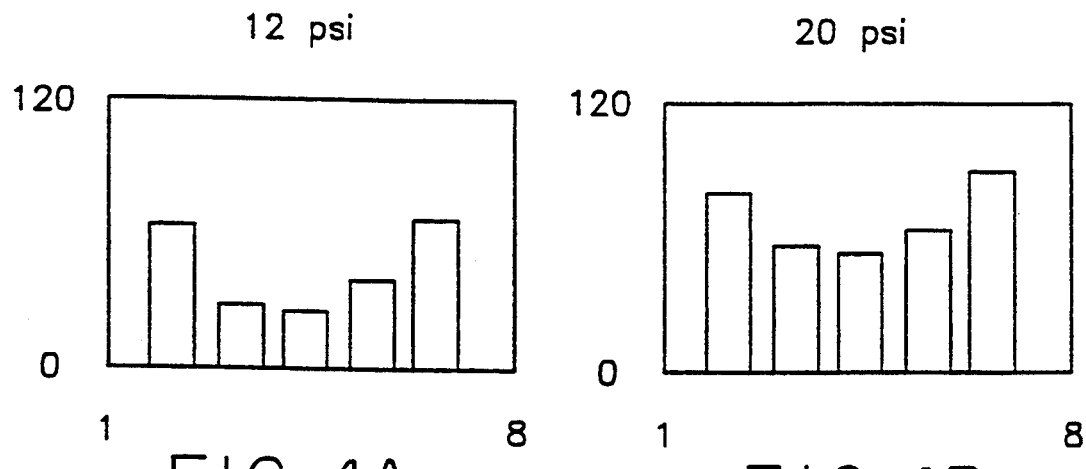
FIGS. 4A through 4E show the contact force distribution for data of Table 1.
Figures 4C, 4D:
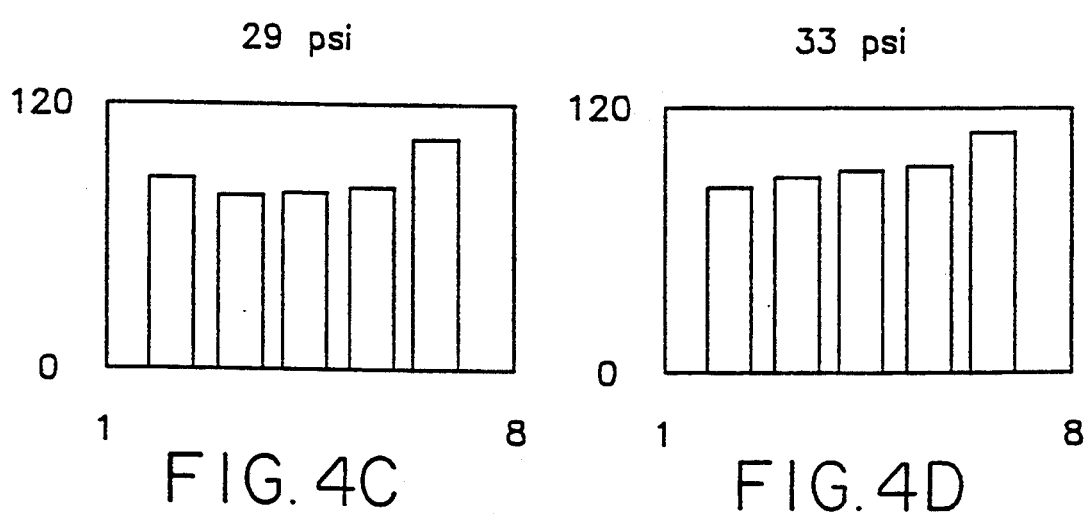
Figure 4E:
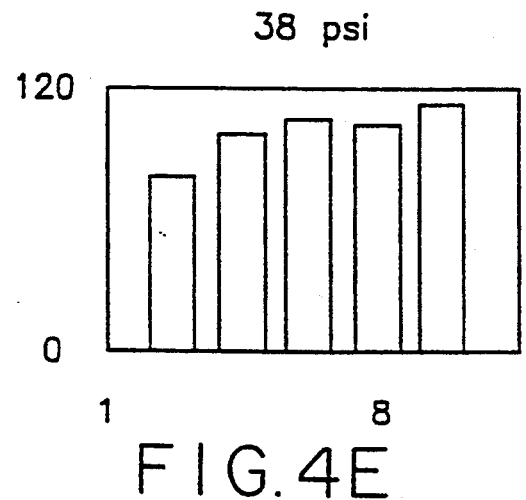

FIG. 3a shows the profile tendency of a tire that is overinflated. FIG. 3b shows the profile tendency of a tire that is under-inflated. At proper inflation to provide maximum traction it is believed that the tire should be in uniform force contact with the horizontal all across the profile.

EXAMPLE 1

Influence of tire pressure on force distribution

A sensor array was fabricated incorporating eight strain gage load cells arranged in a linear array and installed in a driveway pit as depicted in FIG. 2. The load cells used were the Model SP single point compression type obtained from Sensotec, Columbus, Ohio. Load is applied over the horizontal 1 7/16 inch by 1 5/32 inch face of a cantilevered aluminum beam fitted with a foil strain gage that is temperature compensated from 30° F. to 130° F. Non-linearity stated by the manufacturer is ±0.03% of full scale reading. The full scale rating is 100 lb. with 50% overload permissible. Manual readout of the force detected by any one of the sensors was accomplished, when desired, using the Model SA-10 multi-channel electronic package supplied by the same manufacturer. The same package supplied 10 volt DC excitation to the load cells. Dead weights of 50 and 100 lbs. were used to check the calibration of the individual load cells from time to time.

The cantilevered beams were mounted in alternating staggered fashion so that the load cell faces were located contiguously with approximately 1/16 inch spacing, the 1 7/16 inch dimension defining the length of the sensor face along the direction of vehicular motion, and with the 1 5/32 inch dimension oriented along the transverse direction of a tire. The total width of the sensor array measured about 9 3/4 inches.

Tests were conducted using a three door 1985 Saab Turbo passenger vehicle equipped with Pirelli 195/60/R15 tires on the front wheels. In these tests the load cells were mounted nominally flush with the driveway. FIGS. 4A through 4E display the resultant distribution of forces for tests in which tire pressure was set at 12, 20, 29, 33 and 38 psi. These data are tabulated in Table 1. The vehicle manufacturer's recommended inflation pressure is 27 to 29 psi.

TABLE 1

Contact Force Distribution of Pirelli 195/60 R15 Radial Tire at Various Tire Inflation Pressures Units of Force (lb.)

| Sensor Number | Tire Inflation Pressure, psi | | | | |
|---|---|---|---|---|---|
| | 12 | 20 | 29 | 33 | 38 |
| 1 | 0 | 0 | 0 | 0 | 0 |
| 2 | 63.7 | 79.6 | 86.3 | 83.8 | 79.9 |
| 3 | 32.1 | 56.9 | 77.2 | 87.7 | 98.0 |
| 4 | 28.2 | 55.9 | 78.9 | 92.0 | 105.1 |
| 5 | 41.0 | 63.7 | 83.2 | 93.7 | 103.9 |
| 6 | 68.4 | 89.9 | 102.9 | 108.2 | 112.9 |
| 7 | 0 | 0 | 0 | 0 | 0 |
| 8 | 0 | 0 | 0 | 0 | 0 |

From FIGS. 4A through 4E it can be seen that contact force of the under-inflated tire (12 psi or 20 psi) is minimum at the center. At a normal tire inflation pressure (29 psi) the forces tend to be more uniformly distributed over the sensors. The overinflated tire (33 psi or 38 psi) presents a more complex pattern, suggestive with the idealization of an overinflated tire.

It will be appreciated that noise sources are present that tend to scatter the sensed force values. These include: sensor offset and scale factor variations, incommensurability of tire width and sensors width, variation in position of tire relative to the sensors (phasing), and variation of tread pattern in contact with the sensors, e.g., due to tire angular displacement. Example 2 illustrates the reduction of noise by filtration of the signals.

EXAMPLE 2

Filtration to reduce noise

Consider the case when tread gaps in the tire are smaller in scale than the dimension of the sensor faces and accordingly are a source of high spatial frequency noise that tends to degrade the information contained in the sensed force distribution. This example illustrates the reduction of said noise using Fourier filtration and is a preliminary to Example 3.

Thus, the discrete force values in the distributions of Example 1 will be decomposed into harmonic components using the discrete Fourier transform. See, for example, Bracewell, R., "The Fourier Transform and its Applications", 2nd Edn., 1978, McGraw-Hill, Inc., New York, Chapter 18.

General expressions for the transform and its inverse can be written in matrix form as follows:

$$tf = W \cdot \frac{f}{n} \quad (1)$$

$$f = V \cdot \frac{tf}{n} \quad (2)$$

where f is the vector of forces detected by the array of sensors, $n = N^{\frac{1}{2}}$ where N is the number of sensors in forceful contact with the tire, and tf is the discrete Fourier transform of f. The matrices W and V are defined in terms of w, the Nth root of unity.

$$w = exp(2\pi i/N) \quad (3)$$

where i is the square root of minus one.

$$W_{j,k} = w^{j \cdot k} \; j = 0,1,2, \ldots, N-1 \quad (4)$$

$$V_{j,k} = w^{-j \cdot k} \; k = 0,1,2, \ldots, N-1 \quad (5)$$

For the data of Example 1, N has the numerical value of 5. The corresponding force vectors may be written as follows:

$$f^{(1)} = \begin{bmatrix} 63.7 \\ 32.1 \\ 28.2 \\ 41.0 \\ 68.4 \end{bmatrix} \quad f^{(2)} = \begin{bmatrix} 79.6 \\ 56.9 \\ 55.9 \\ 63.7 \\ 89.9 \end{bmatrix} \quad f^{(3)} = \begin{bmatrix} 86.3 \\ 77.2 \\ 78.9 \\ 83.2 \\ 102.9 \end{bmatrix}$$

$$f^{(4)} = \begin{bmatrix} 83.8 \\ 87.7 \\ 92.0 \\ 93.7 \\ 108.2 \end{bmatrix} \quad f^{(5)} = \begin{bmatrix} 79.9 \\ 98.0 \\ 105.1 \\ 103.9 \\ 112.9 \end{bmatrix}$$

Transformation of the forces using Eq. 1 results in the following spectra:

$$tf^{(1)} = \begin{bmatrix} 104.38 \\ 17.339 - 18.804i \\ 1.689 - 4.098i \\ 1.689 + 4.098i \\ 17.339 + 18.804i \end{bmatrix} \quad (7)$$

$$tf^{(2)} = \begin{bmatrix} 154.736 \\ 12.614 - 16.086i \\ -0.986 - 5.357i \\ -0.986 + 5.357i \\ 12.614 + 16.086i \end{bmatrix}$$

$$tf^{(3)} = \begin{bmatrix} 191.631 \\ 4.835 - 12.061i \\ -4.165 - 4.927i \\ -4.165 + 4.927i \\ 4.835 + 12.061i \end{bmatrix}$$

$$tf^{(4)} = \begin{bmatrix} 208.133 \\ -2.638 - 9.166i \\ -7.738 - 4.666i \\ -7.738 + 4.666i \\ -2.638 + 9.166i \end{bmatrix}$$

$$tf^{(5)} = \begin{bmatrix} 223.517 \\ -10.739 - 6.022i \\ -11.689 - 4.427i \\ -11.689 + 4.427i \\ -10.739 + 6.022i \end{bmatrix}$$

In the above spectra, the real valued amplitude represents mean force, the next component specifies amplitude and phase of the first harmonic, and the middle component specifies amplitude and phase of the second, or highest harmonic. The last components are complex conjugate to the first and second components. It will be supposed that the highest harmonic is the most representative of noise and can be beneficially filtered. Setting these coefficients to zero the spectra then become:

$$tf^{(1)} = \begin{bmatrix} 104.38 \\ 17.339 - 18.804i \\ 0 \\ 0 \\ 17.339 + 18.804i \end{bmatrix} \quad (8)$$

$$tf^{(2)} = \begin{bmatrix} 154.736 \\ 12.614 - 16.086i \\ 0 \\ 0 \\ 12.614 + 16.086i \end{bmatrix}$$

$$tf^{(3)} = \begin{bmatrix} 191.631 \\ 4.835 - 12.061i \\ 0 \\ 0 \\ 4.835 + 12.061i \end{bmatrix}$$

$$tf^{(4)} = \begin{bmatrix} 208.133 \\ -2.638 - 9.166i \\ 0 \\ 0 \\ -2.638 + 9.166i \end{bmatrix}$$

-continued $$f^{(5)} = \begin{bmatrix} 223.517 \\ -10.739 - 6.022i \\ 0 \\ 0 \\ -10.739 + 6.022i \end{bmatrix}$$

The above low pass spectra may be inverted using Eq. 2 to yield the filtered force data. With a redefinition of symbols these are:

$$f^{(1)} = \begin{bmatrix} 62.189 \\ 35.477 \\ 24.248 \\ 44.019 \\ 67.468 \end{bmatrix} \quad f^{(2)} = \begin{bmatrix} 80.482 \\ 59.003 \\ 51.616 \\ 68.529 \\ 86.37 \end{bmatrix} \quad f^{(3)} = \begin{bmatrix} 90.025 \\ 76.777 \\ 75.861 \\ 88.542 \\ 97.296 \end{bmatrix} \quad (9)$$

$$f^{(4)} = \begin{bmatrix} 90.72 \\ 84.554 \\ 90.17 \\ 99.808 \\ 100.148 \end{bmatrix} \quad f^{(5)} = \begin{bmatrix} 90.355 \\ 91.869 \\ 104.565 \\ 110.897 \\ 102.114 \end{bmatrix}$$

The data, having now been filtered, are in better condition to be decomposed into a measure of inflation. A particular technique to achieve the decomposition is illustrated in the following example.

EXAMPLE 3

Decomposition yielding a graphical measure of inflation

The footprint of a new or uniformly worn tire is assumed to be symmetric about its center line. Any deviation from symmetry may be regarded as an extraneous component of the signal. Any distribution (represented by vector) f having N components $f_i$ where $i = 0, 1, 2, \ldots (N-1)$ can be decomposed into the sum of a symmetrical or even part fe an an unsymmetrical or odd part fo as follows:

$$f = fe + fo \quad (10)$$

where $$fe_i = \tfrac{1}{2}(f_i + f_{N-1-i}) \quad (11)$$

$$fo_i = \tfrac{1}{2}(f_i - f_{N-1-i}) \quad (12)$$

This decomposition is valid whether N is an even or odd integer. The even part fe is associated with tire inflation. The filtered data, Eqs. 9 of Example 2 when decomposed yield the following even and odd component vectors.

$$fe^{(1)} = \begin{bmatrix} 64.83 \\ 39.75 \\ 22.25 \\ 39.75 \\ 64.83 \end{bmatrix} \quad fe^{(2)} = \begin{bmatrix} 83.43 \\ 63.77 \\ 51.62 \\ 63.77 \\ 83.43 \end{bmatrix} \quad fe^{(3)} = \begin{bmatrix} 93.66 \\ 82.66 \\ 75.86 \\ 82.66 \\ 93.66 \end{bmatrix} \quad (13)$$

$$fe^{(4)} = \begin{bmatrix} 95.43 \\ 92.18 \\ 90.17 \\ 92.18 \\ 95.43 \end{bmatrix} \quad fe^{(5)} = \begin{bmatrix} 96.23 \\ 101.38 \\ 104.57 \\ 101.38 \\ 96.23 \end{bmatrix}$$

$$fo^{(1)} = \begin{bmatrix} -2.64 \\ -4.27 \\ 0 \\ 4.27 \\ 2.64 \end{bmatrix} \quad fo^{(2)} = \begin{bmatrix} -2.94 \\ -4.76 \\ 0 \\ 4.76 \\ 2.94 \end{bmatrix} \quad fo^{(3)} = \begin{bmatrix} -3.64 \\ -5.88 \\ 0 \\ 5.88 \\ 3.64 \end{bmatrix}$$

$$fo^{(4)} = \begin{bmatrix} -4.71 \\ -7.63 \\ 0 \\ 7.63 \\ 4.71 \end{bmatrix} \quad fo^{(5)} = \begin{bmatrix} -5.88 \\ -9.51 \\ 0 \\ 9.51 \\ 5.88 \end{bmatrix}$$

Figure 5:
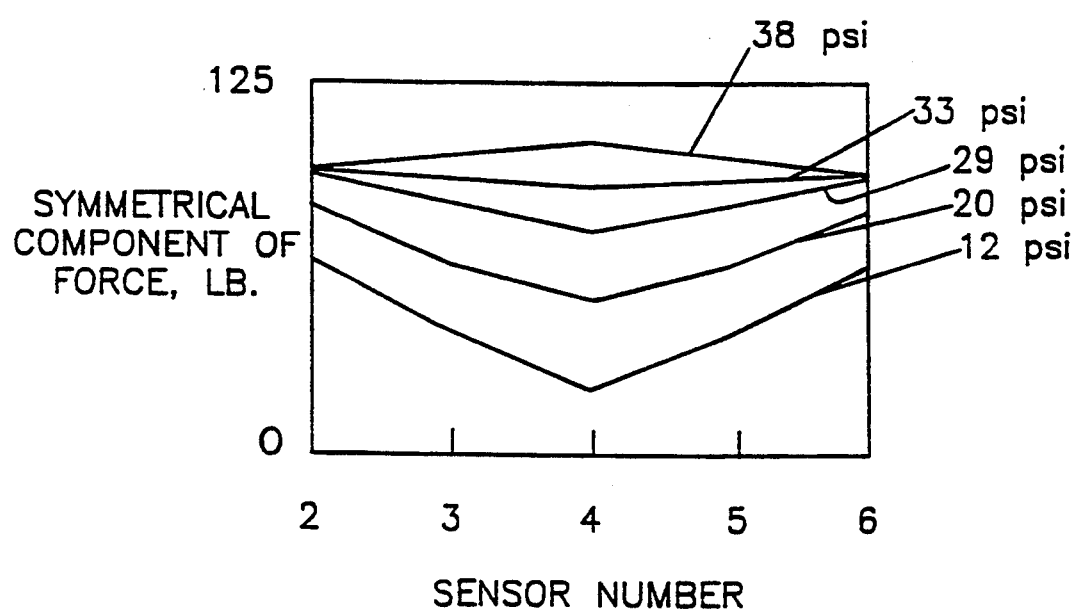
FIG. 5 shows the symmetrical component of the force distributions of FIG. 4.

FIG. 5 shows that the individual even curves are well ordered with the tire inflation pressure as parameter. The deviation from flatness of the curves in FIG. 5 provides a measure of the goodness of road contact.

Mean contact pressure (pseudopressure)

Highway engineers commonly assume that the contact pressure over the footprint of a tire is uniform and equal in magnitude to the inflation pressure of the tire (K. Marshek et al, "Experimental Determination of Pressure Distribution of Truck Tire-Pavement Contact," Transportation Record 1070, pp. 9–14, 1987). The actual pressure distribution deviates considerably from the uniform pressure model. While a planar array of force sensors provides a means to measure the distribution of forces statically or dynamically, i.e., with the tire at rest and in contact with the planar array or as the vehicle moves over the array, in the following we discuss the use of a linear array. Two dimensional arrays may also be used. However, a linear array should be more economical to provide. The linear array of load cells provides a means to measure the distribution of contact pressure in real time as a vehicle passes over the array.

Thus, when a vehicle passes over a linear array each sensor in the array experiences a time-varying applied force. The time dependent data can be used as discussed below to compute a mean contact pressure or pseudopressure. The pseudopressure may be used by itself or in combination with other measures to infer the tire inflation pressure.

Figure 6A:
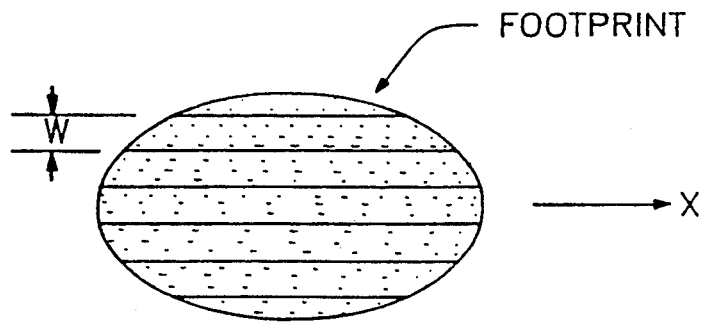
FIG. 6(a) shows a schematic illustration of tire footprint illustrating strips having width w of the load cell sensors x is the direction of vehicle motion.
Figure 6B:
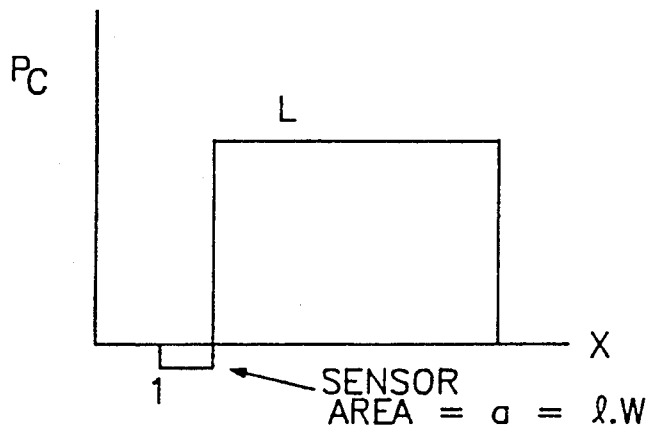
FIG. 6(b) shows an illustration of square-wave contact-pressure distribution along a strip of length L. 1 is length of sensor face.
Figure 6C:
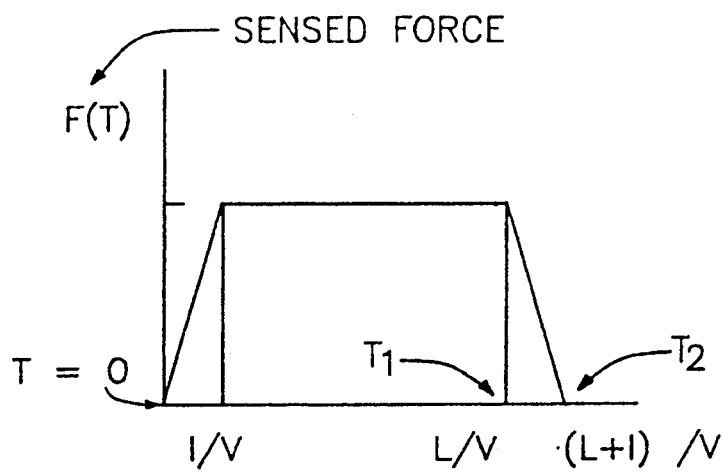
FIG. 6(c) shows an illustration of trapezoidal contact pressure distribution due to sampling by the finite size sensor.

FIG. 6c illustrates schematically the time dependence of force, F(t), anticipated for a given sensor for a vehicle moving at velocity v if the actual contact pressure is uniformly distributed as shown in FIG. 6b. The time trace is trapezoidal shaped having a plateau region of nearly constant force with sides that ramp up and down. (Refer to FIGS. 7a,b and 8a,b for examples of experimental time traces.) Thus, because the sensor has a finite length l along the direction of vehicle motion a duration of time of magnitude l/v is required for the tire to cover or uncover a sensor.

Because contact pressure at a point varies drastically within a footprint, and disappears in regions of tread gap, we consider a local contact pressure $P_c$ defined as the total force on an area having the size and shape of a sensor face, divided by that area. Thus, $$P_c = \frac{F(t)}{w\,l} \quad (14)$$

where w is sensor width and l is sensor length. At a given instant of time the pseudopressure, denoted as $P_s$ is given by $$P_s = \frac{\text{Total force}}{\text{Total area}} \quad (15)$$

where $$\text{Total force} = \Sigma \int P_c dA \quad (16)$$

$$\text{Total area} = \Sigma \int dA \quad (17)$$

in which $dA = w\,dx$ where x is distance along the vehicle path of motion, assumed perpendicular to the linear array, and the summation is taken over the number of sensors contacted by the footprint. Substituting in (16) for $P_c$ using (14) and introducing $dx = v\,dt$ gives $$\text{Total force} = \Sigma \frac{v}{l} \int F(t)dt \quad (18)$$

Likewise, $$\begin{aligned}\text{Total footprint area} &= w\Sigma dx \\ &= w\Sigma L \\ &= wv\Sigma t_1\end{aligned} \quad (19)$$

where L is the local length of the footprint section at a given sensor position, and $t_1$ is the corresponding time duration of passage. Substituting (18) and (19) into (15) and canceling the common factor v gives a result that is independent of the vehicle velocity v.

$$P_s = \frac{\Sigma \int F(t)dt}{w l \Sigma t_1} \quad (20)$$

The transformation $dx = v\,dt$ employed above represents a simplifying assumption. In fact, the portion of tread that initially contacts a sensor face remains in place while the loading changes with time. In the special case that the tire is treadless the relationship becomes exact.

Equation (20) expresses $P_s$ exclusively in terms of measurable parameters. Selection of time $t_1$, rather than time $t_2$ (refer to FIG. 6c) for use in the equation constitutes an important feature. Time $t_1$ measures the duration of time from the instant the tire first contacts the sensor to the time at which the tire first begins to lift off the sensor.

The velocity during the interval of time when the tire comes off the sensor can be acquired. Referring to FIG. 6c, extraction of the time duration $t_2 - t_1$ permits vehicle velocity v to be determined from the known length l of a sensor using the relationship $v = l/(t_2 - t_1)$. The difference of velocities together with the known time interval between acquiring the velocities can be used to compute the vehicle acceleration or deceleration and, if desired, to estimate a correction to the measured forces using Newton's laws of mechanics. The correction to measured force can be considerable, even at driveway speeds, e.g., if a driver suddenly applies the brakes. The corrected forces can be used in any of the modes of data reduction disclosed in this patent application. Alternatively, it may be desired to simply detect the presence of excess acceleration or deceleration, recognize that the prediction will be adversely affected, and accordingly reject the measurement.

As discussed, the sensor array of this invention permits velocity to be determined based on the time duration of signal as a vehicle covers or uncovers a sensor of the array. Table 2 lists values of vehicle velocity determined by the above technique.

TABLE 2

Experimental Values of Vehicle Velocity Sensed From Transient Force Data (Sensor Length of 1 7/16 inch)

| Vehicle | Tire Pressure (psi) | Velocity (fps) | |
|---|---|---|---|
| | | On | Off |
| Saab | 12 | 3.32 | 3.37 |
| Saab | 28 | 4.33 | 4.33 |
| Saab | 38 | 3.27 | 3.45 |
| Pontiac | 12 | 4.55 | 4.69 |
| Pontiac | 29 | 4.66 | 4.99 |
| Pontiac | 38 | 3.88 | 4.39 |

The next example illustrates the application of Eq. (20) using test data.

EXAMPLE 4

Dynamic measurement of footprint forces and the extraction of pseudopressure

The sensor array and readout of Example 1 was automated with a digital data logging system consisting of a LeCroy Model 8212A waveform digitizer with Model 8800A 32K by 12-bit memory having a maximum sampling rate of 100 kHz on one active channel and up to 5 kHz simultaneous sampling on 32 channels. The acquired data was transmitted via a Model 8901 GPIB Instrument Controller to a Compaq 386SX computer equipped with an Intel 80287 math coprocessor, a 40 Mbyte hard disk drive, and Asyst software from which waterfall, axonometric, and contour plots could be computed and displayed.

Figure 7A:
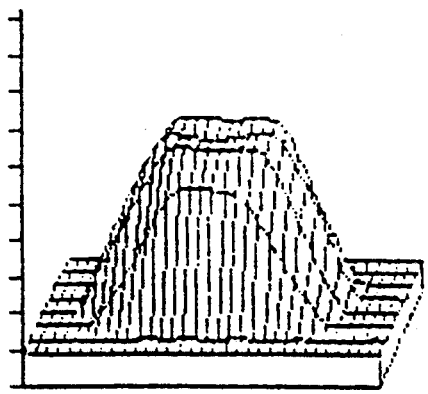
FIG. 7(a) shows an axonometric side view.
Figure 8A:
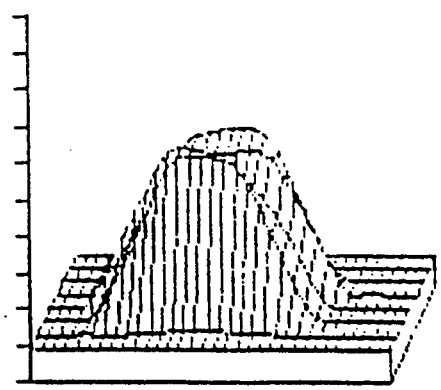
FIG. 8(a) shows an axonometric side view.
Figure 7B:
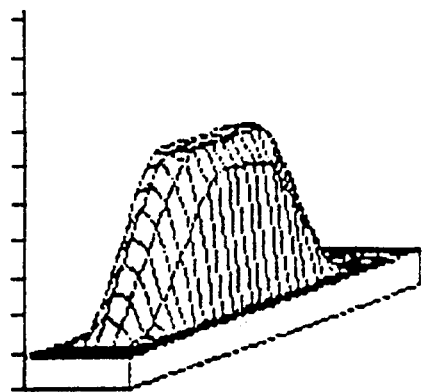
FIG. 7(b) shows an axonometric rotated view.
Figure 8B:
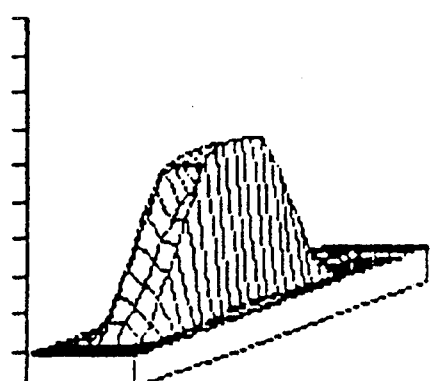
FIG. 8(b) shows an axonometric rotated.
Figure 7C:
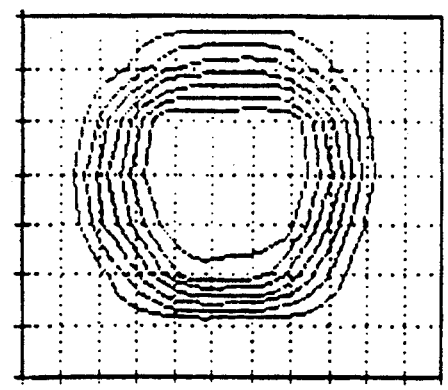
FIG. 7(c) shows a contour plot.
Figure 8C:
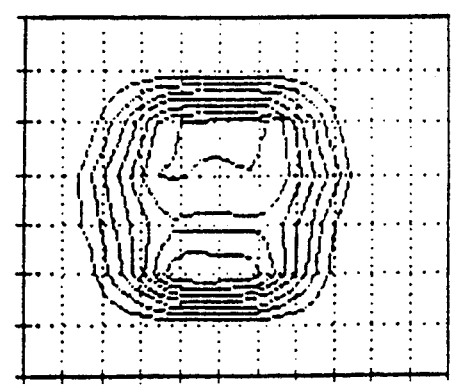
FIG. 8(c) shows a contour plot.

FIG. 7(a) through 7(c) illustrate the dynamically-acquired tire-footprint force-distribution for a tire of normal inflation. In the axonometric plots, force (in arbitrary units) is represented on the vertical axis and time (in arbitrary units) is represented on a horizontal axis for each of the eight sensor channels. The appearance of the contour plot in FIG. 7(c) is very typical of a normally inflated tire (one peak or bull's-eye pattern). FIG. 8(a) through 8(c) display corresponding plots for an underinflated tire. The pattern of twin peaks (catseyes) is very typical of an underinflated tire.

Table 3 compares the sensor force readings channel by channel for data acquired statically (vehicle at rest on the sensors) versus data acquired dynamically (vehicle passing over the sensors). It can be seen that the readings are comparable for a given tire pressure regardless of whether the vehicle is at rest or in motion (at approximately constant velocity).

From the above it is apparent that tire footprint data can be acquired even though the vehicle is in motion.

TABLE 3

Comparison Of Sensor Readings (Lbs. Force) In Static And Dynamic Testings[a]

| Type of Test | Tire Pressure (psi) | Sensor Number | | | | | | | | |
|---|---|---|---|---|---|---|---|---|---|---|
| | | 1 | 2 | 3 | 4 | 5 | 6 | 7 | 8 | Σ |
| Static | 25 | 3.0 | 33.1 | 37.6 | 30.1 | 27.2 | 56.0 | 22.7 | 0 | 209.7 |
| Dynamic | 25 | 0.0 | 33.7 | 37.8 | 33.9 | 28.8 | 55.5 | 27.7 | 0 | 217.4 |
| Dynamic | 25 | 0.0 | 35.3 | 38.6 | 32.7 | 25.5 | 51.5 | 24.4 | 0 | 208.0 |
| Static | 12 | 6.0 | 35.2 | 19.2 | 12.1 | 11.6 | 25.7 | 13.7 | 2.3 | 125.8 |
| Dynamic | 12 | 12.5 | 36.6 | 18.7 | 12.0 | 13.3 | 26.8 | 10.5 | 0.0 | 130.4 |
| Dynamic | 12 | 8.8 | 30.5 | 18.7 | 11.4 | 13.0 | 28.0 | 12.2 | 0.0 | 122.6 |

[a] Mercury Topaz, Right Front Wheel, Tigar TG615 185/70 R14

Additional data were acquired dynamically using a treadless racing slick (Hickey Thompson ET Drag 26.0/8.5–15) mounted on the right rear wheel of a 1990 Pontiac Grand Prix LE passenger car. The vehicle was driven over the sensor array described in Example 1 a number of times at each of seven levels of tire inflation pressure spanning the range from about 5 psi to 38 psi. Vehicle velocity was nominally constant in the range of 3 to 5 mph. Time resolved data on the eight sensor channels was collected and processed using Eq. (20) with the results as displayed in FIG. 9. Diagonal line 2 represents parity under the idealized condition that tire inflation pressure has the same magnitude as the pseudopressure under all conditions. The plotted points are computed from Eq. (20).

No correction has been applied for sensor readings falling at the tire edges where incomplete sensor coverage usually occurs. More narrow sensors can be used to reduce the area source of error. Alternatively, an edge correction can be made. It will be understood that the present system is not optimized and can be further improved.

Figure 9:
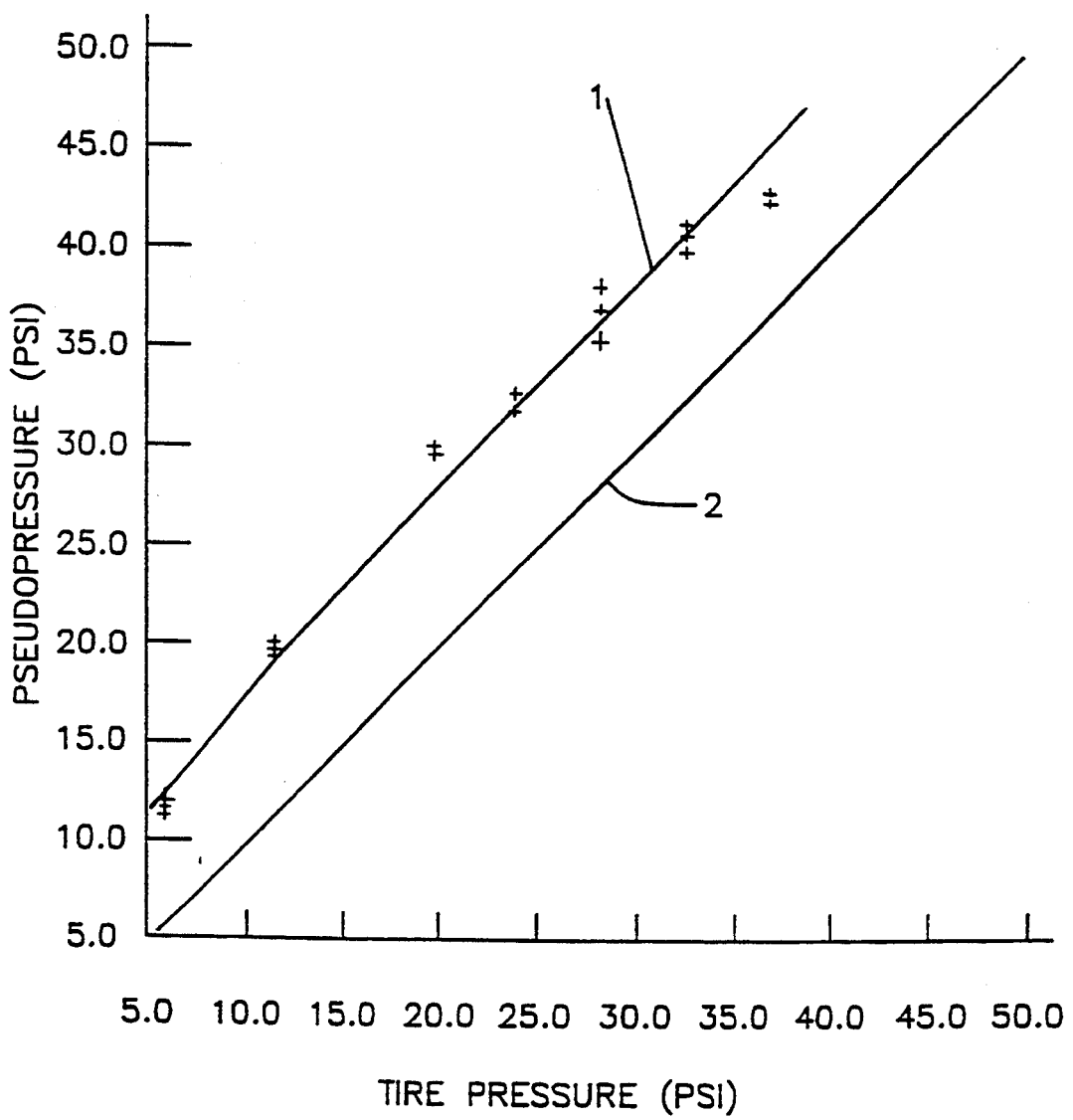
FIG. 9 shows the pseudopressure determined from dynamic footprint measurements vs. tire pressure.

Additional tests using a treaded tire yield similar results to those shown in FIG. 9 except that more scatter is present. Longer sensors may be used to average over a greater area of tread to reduce the scatter. Alternatively, one or more additional lines of sensors can be deployed in parallel arrangement with the first line of sensors for the same purpose. Staggering the additional sensors will permit further reduction of the scatter.

In summary, this example contributes another means of data reduction whereby the array of load cells can be used to infer pseudopressure as a measure of tire pressure.

It is noted that difference in pseudopressure from one tire to another can be used to detect a variance in tire inflation as a warning that one or another tire needs inspection. Used in this manner the system need not be absolutely calibrated to read actual tire pressure. Likewise, other features as well as inferred values of tire pressure can be used in similar comparative fashion, if desired. These values can be determined by any of the methods discussed above or below.

Neural Network Recognition of Tire Patterns

Neural networks are a computational method capable of learning patterns inherent in data by a process of supervised training. The trained networks subsequently can be used to classify data inputs not previously presented to the network. See, for example, *Parallel Distributed Processing*, Vol. 1. Foundations (1988) Rummelhart, D. E. and McClelland, J. L., MIT Press, Cambridge, Mass. and *Neural Works Professional II: Users Guide*. Vol. 1 Neural Computing, October 1989, Published by Neural Ware, Inc., Pittsburgh, Pa.

It is not likely that the tire, when driven onto the array of load cells, will be phased exactly on the load cells. That is, misalignment maybe introduced at the edges of the tire due to partial coverage of the load cells located at the tire edges. Also, the width of the tire footprint may be incommensurate with the width of the sensor array. These and other non-idealities tend to give the force distribution a complex appearance. The next example illustrates how the complex patterns of force distribution may be successfully interpreted using a neural network.

Figure 10:
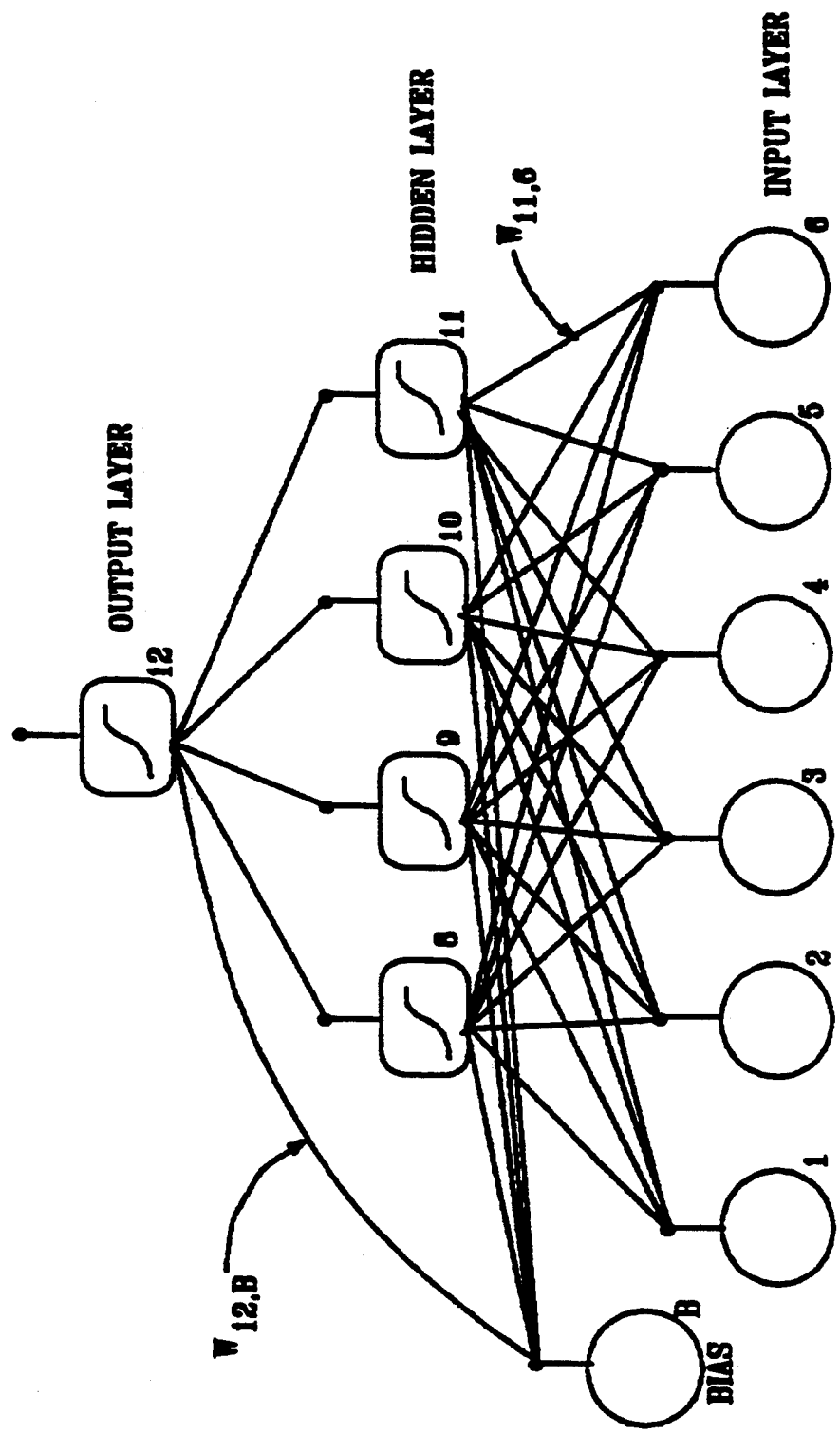
FIG. 10 shows a neural network to determine tire inflation.

A neural network having feed forward architecture, see FIG. 10, was defined. The network consists of three layers of artificial neurons connected from layer to layer by adjustable weights. A bias cell having constant unit output is connected by adjustable weights to the artificial neurons of the hidden layer and output layer. Data are fed to the artificial neurons of the input layer and representing reduced force. At the start of the network training process the weights in the network are assigned randomly chosen values.

For example, the weight connecting neuron 1 to neuron 8 is labeled $w_{81}$, the weight connecting neuron 6 to neuron 9 is labeled $w_{96}$, etc. The weighted inputs to a neuron j in the hidden or output layer of the network are summed according to the following expression to yield a value denoted $Net_j$.

$$Net_j = \sum_i w_{ji} O_i \tag{44}$$

where $O_i$ is the output of the ith neuron in the layer below, $w_{ji}$ is the weight connecting from neuron i to neuron j. Output for any neuron in the input layer is the same as its input. Output for any neuron in the hidden layer is nonlinearly remapped into the range from 0 to 1 using the sigmoidal function, as follows:

$$Out_j = \frac{1}{1 + \exp(-Net_j)} \tag{45}$$

Initially the output inflation Δ of the neuron in the output layer of the network, in response to a (vector) input of values impressed upon the input layer, has a value that deviates widely from the correct value of Δ associated with those inputs. Using a training set of input vectors, each with its associated parameter Δ, each member of the set having been randomly generated as described previously, the weights of the network are adjusted to yield a least squares error over the ensemble. This optimization may be carried out in any of various ways known to one skilled in the art.

EXAMPLE 5

Neural network trained on experimental tire data

The linear array of eight load cell sensors described in Example 1 was employed to detect force distribution across the footprint for the vehicle/tire combinations listed in Table 4. The data were obtained along a meridian of the tire with the vehicle at rest over the sensors such that a mid-footprint force reading was displayed. A total of 35 tests were run in which the tire inflation pressure ranged from less than 40% to more than 130% of the car manufacturer's recommended normal inflation. Each test resulted in a set of force readings which were normalized by a uniform constant value and made the input values to a neural network having an input layer of six neurons, a hidden layer of four neurons, and a single output layer (see FIG. 10). The number of load cell sensors in contact with a tire varied from test to test. The actual inflation pressure, normalized, provided the target output during training of the net.

Figure 11:
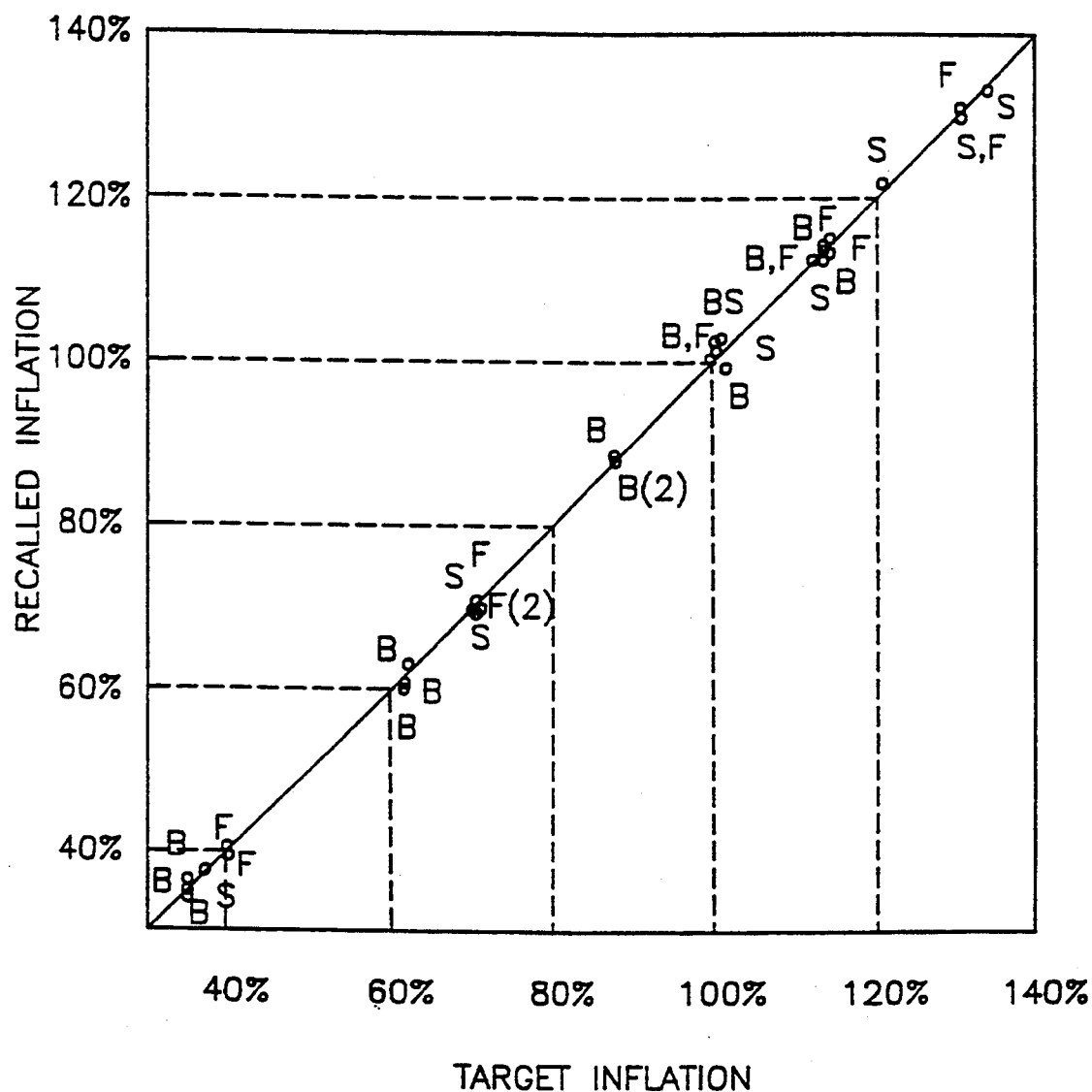
FIG. 11 shows a neural network performance in recognizing experimental tire inflation (recall of 38 training sets).

Following training the inputs from the training sets were fed to the network and the recalled inflation pressure, i.e., the network output, suitably unnormalized, was noted and plotted, resulting in the parity plot of FIG. 11. It can be seen from the figure that the net learned to recognize the patterns of the training set to a high precision (ratio of standard deviation to mean of about 2%). When a neural network was configured using three neurons in the hidden layer the learning was somewhat degraded (ratio of standard deviation to mean of about 4%).

By training a neural network with representative numbers and types of tires and vehicles, the network may be used to infer the pressure of tires it has not been taught previously. It will also be understood that the neural network possesses the ability to classify patterns of force distribution in the presence of noise contributed by tread variations, unknown degree of phasing, incommensurate tire width relative to sensor layout, etc. The trained network/sensor system can be used for automated measurement of tire pressure as a convenience to drivers.

TABLE 4

Test Vehicles And Tires (Right Front Wheel)

| Vehicle | Tire I.D. | Normal Inflation (psi) |
|---|---|---|
| Saab 900 Turbo | Pirelli MXV 195/60 R15-87H | 27 |
| BMW | Pirelli P600 205/55 VR15 | 33 |
| Ford Festiva LX | Yokohama 165/70 SR12 | 29 |

Although the primary intent of this invention is to define a system having stand alone capability it should be understood that the invention may be used in conjunction with externally provided information to achieve its operation, e.g., knowledge of tire type, vehicle type, vehicle loading, or other data. Such information may allow selection of a particular neural network having specialized training to perform the decision making function required to practice the invention.

A single array of sensors can serve to acquire signals from front and rear tires of a vehicle that passes over the array.

Skewness of the footprint about the vehicle direction of motion may be used to correct the footprint readings when a vehicle passes obliquely across the array of sensors.

The invention also functions as a counter of vehicles passing by a fixed site. This functionality may be achieved, for example, by actuating a counter that records the number of times that a sensor transmits the onset of a force vs. time signature.

EXAMPLE 6

Neural network trained on features extracted from experimental data

The performance of a neural network of the type described in Example 5 in predicting the tire pressure for a vehicle/tire not included in the training data is less accurate than the recall accuracy illustrated in FIG. 11. I have found that a more accurate prediction can be made by extracting characteristic features from the raw force data and using these features as the inputs to a neural network. The characteristic features are desirably insensitive to phasing of a given tire relative to the sensors. These characteristics may be determined by measuring the footprint force distribution for a given tire. Then a characteristic feature is computed from the distribution. The feature is then redetermined for the same tire by repeating the test with another phased position. If the computed feature remains reasonably constant over a number of such tests, then that feature may be used to train the neural net. A number of such features have been identified, as discussed below.

Pseudopressure PS defined previously (see Equation 20) furnishes a useful feature. Using a 20 cell array of contiguous 0.5 inch wide sensors, the pseudopressure is reproducible with average standard deviation of 3.5% on treaded tires. The ratio PT/PS of tire pressure PT to pseudopressure PS typically varies over a rather narrow range from about 0.33 to 0.67. A neural network can be trained to a target output of PT/PS rather than PT in which case the network computes a correction factor having a limited range of variability.

It is found that SF the summation of forces over the active sensors at midpoint in time of a footprint data pulse serves as another suitable feature.

$$SF = \left( \sum_i F_i \right) t_m \quad (t_m = \text{midpoint time}) \quad (21)$$

The midpoint time is conveniently defined in terms of the longest data trace which, in turn, corresponds to a trace from near the meriodional center of the tire. The corresponding force values are referred to below as the midpoint slice data or slice data.

Another characteristic feature is furnished by a measure of midpoint pressure PO. PO is conveniently extracted from the slice data as an average over a number of centrally located sensors. For example, using sensors of 0.5 inch width the number of active sensors typically range from 8 to 12 in number. Discarding the readings from the three outermost active sensors on both sides of the footprint results in averaging over 2 to 6 cells to yield a value of PO. The value of PO is suitably reproducible from run to run.

Another feature having utility in this work is WF or force-width, defined by the following.

$$\bar{i} = \frac{\Sigma i R_i}{\Sigma F_i} \quad (22)$$

-continued $$WF = \frac{2\Sigma(i - \bar{i})F_i}{\Sigma F_i} \quad (23)$$

i given by Eq. (22) defines the force-weighted center of the individual force value in the slice data. i is the sensor number with numbering defined sequentially from one end of the sensor array to the other. Thus, i represents the position of the center in units of sensor widths. Eq. (23) for WF defines a width of the force distribution, hence a measure of the tire width.

Table 5 lists data from repeat runs illustrating the relative invariance of these various measures.

TABLE 5

Reproducibility of Features
Pontiac Grand Prix - Goodrich P205/65R15
PT = 29.0 psi

| Run Number | PO (arbitrary units) | PS (psi) | WF (dimensionless) | SF (lb) |
|---|---|---|---|---|
| 1 | 26.8 | 46.4 | 6.24 | 336 |
| 2 | 25.1 | 44.9 | 6.23 | 331 |
| 3 | 26.7 | 46.3 | 5.90 | 314 |
| 4 | 25.7 | 45.4 | 6.26 | 327 |
| 5 | 26.3 | 45.7 | 6.24 | 328 |
| 6 | 25.8 | 47.3 | 6.23 | 326 |
| 7 | 25.6 | 45.3 | 5.32 | 275 |
| 8 | 25.2 | 44.8 | 5.25 | 271 |
| 9 | 25.6 | 45.8 | 6.28 | 329 |
| 10 | 25.5 | 45.5 | 6.18 | 323 |
| 11 | 25.4 | 46.3 | 6.19 | 331 |
| 12 | 25.3 | 47.8 | 5.48 | 300 |
| Average | 25.75 | 45.97 | 5.98 | 315.8 |
| Std. Dev. | 0.54 | 0.87 | 0.38 | 21.2 |
| Ratio, % | 2.0 | 1.9 | 6.4 | 6.7 |

The bottom line of the table lists the ratio of standard deviation to average value for each of the four features. Both PO and PS are reproducible to 2.0% or better (one sigma). WF and SF exhibit a greater scatter, but nonetheless contribute useful concerning tire pressure.

A feature data base was established using data acquired from the footprints of front and rear right tires of seven vehicles. Three or more repeat readings were acquired at each of four inflation pressures (37.7, 29.0, 24.7, 11.6 psi). A list of vehicles and tires is given in Table 6.

TABLE 6

Data Base Vehicles and Tires

| Vehicle | Tire Brand | Tire Designation |
|---|---|---|
| Nissan Sedan '87 | Michelin | 155/80R13 M&S |
| Ford Tempo | Invicta | 185/70R14 |
| Saab Turbo '85 | Goodyear | 195/60HR15 M&S |
| Chevy Cav. Wagon '86 | Firestone | 195/70R13 M&S |
| Pontiac GP '90 | Goodrich | 205/65R15 |
| Ford Taurus '90 | Firestone | 205/70R14 M&S |
| Ford Starcraft Van | Sears All Season | 225/75R15 |

A three layer neural network was configured having an equal number of artificial neurons in the input layer and in the hidden layer, and one neuron in the output layer. The sigmoidal transfer function was employed in all but the input neurons. A bias neuron having unit output was connected by variable weights to the neurons of the hidden and output layers.

Figure 12:
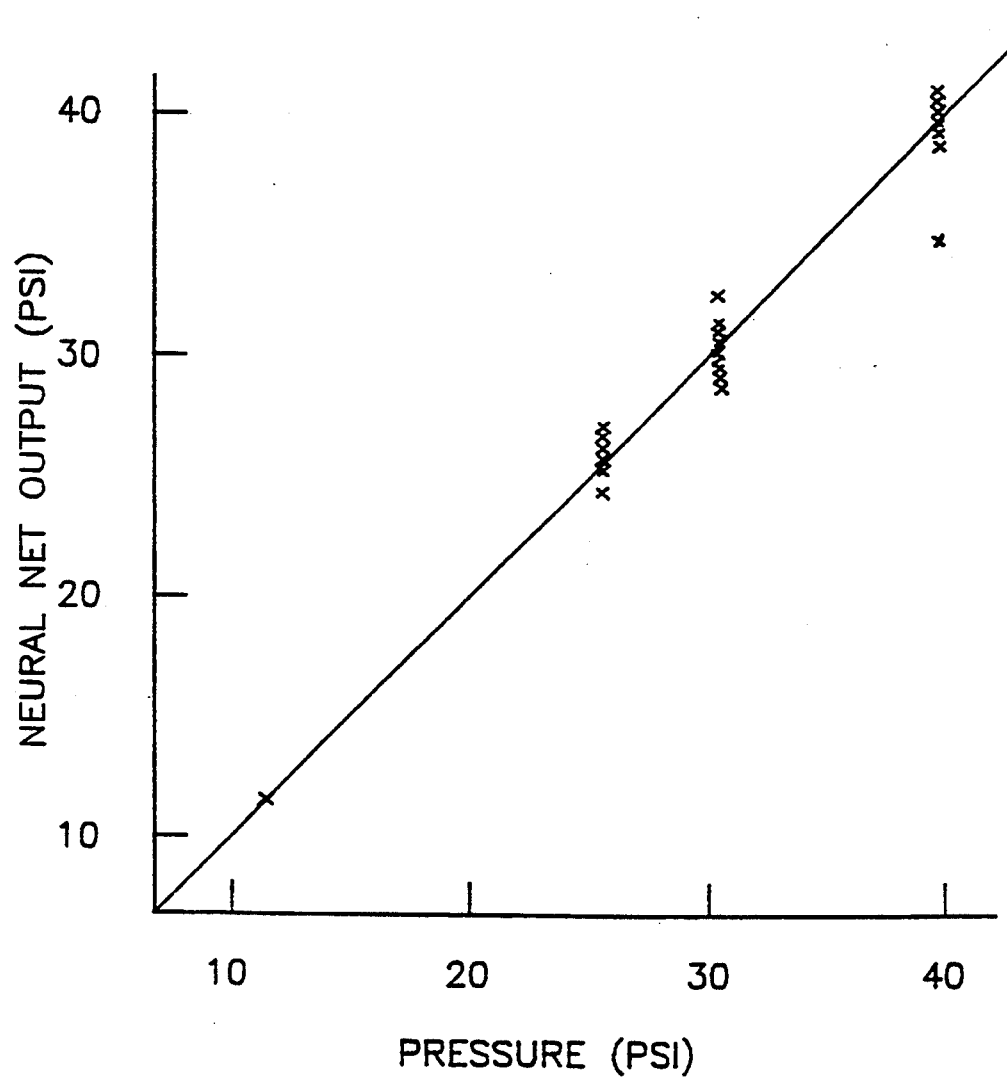
FIG. 12 shows neural network performance for the input data in Example 6.

Weights of the network were determined to minimize error over a training set consisting, for example, of 136 data vectors and their associated target pressure values (the tire inflation pressures). The Nissan sedan was excluded from this test set. The accuracy of the trained network in recalling the target pressures is illustrated in FIG. 12. The root-mean-square ratio of deviation to mean pressure was 1.7% over the training set.

The Nissan sedan, which the network/sensor had not previously seen, was then tested. The predicted pressures are listed in Table 7 wherein it can be seen that the neural network produces a reasonable estimation of the actual tire pressures. By including more vehicles in the data base the accuracy of the method can be further improved.

TABLE 7

Neural Network Predictions of
Nissan Sedan Front Tire Pressures

| Actual Inflation Pressures, psi | Predicted Pressure, psi |
|---|---|
| 11.6 | 11.9 |
| 11.6 | 12.2 |
| 11.6 | 11.8 |
| 24.7 | 25.7 |
| 24.7 | 22.2 |
| 24.7 | 23.9 |
| 29.0 | 31.5 |
| 29.0 | 28.9 |
| 29.0 | 30.2 |

What is claimed is:

1. A system for determining the pressure a pneumatic vehicular tire while mounted on the wheel of vehicle, and/or velocity of the vehicle comprising:

a. an array of load sensors which provide a two-dimensional pattern of the force distribution exerted by said tire in contact with said sensors as the vehicle passes over said array;

b. a computer which is programmed (programmed computer) to determine said tire inflation pressure and/or velocity from said force distribution data independent of the make or model of said tire and said vehicle; and c. means for displaying said pressure (and) and/or velocity.

2. The system of claim 1 wherein said load sensors are a linear array located in a driveway such that vehicles may pass over them.

3. The system of claim 1 wherein said load sensors are strain gages.

4. The system of claim 1 wherein said sensors are piezoelectric and/or piezoresistance films.

5. The system of claim 1 wherein said load sensors are monitored in the driveway approaching or adjacent to gasoline service pump.

6. The system of claim 1 wherein said programmed computer (program) includes a neural network.

7. The system of claim 1 wherein said means for displaying is a visual display in close proximity to said vehicle.

8. The system of claim 1 wherein said force distribution data is filtered by said computer.

9. The system of claim 1 wherein said force distribution data is decomposed into symmetrical and unsymmetrical parts by said computer in order to determine measures of tire pressure.

10. The system of claim 1 wherein said computer uses said force distribution data to determine a mean contact pressure.

11. The system of claim 1 wherein said tire pressure is determined by said computer by neural network recognition.

12. The system of claim 11 wherein said neural (net) network is trained on inputs that are insensitive to the position of tire on said sensors.

13. The system of claim 12 wherein said neural (net) network is trained on pseudopressure, summation of forces, midpoint pressure, and force-width data.

14. The system of claim 8 wherein said neural net is trained on pseudopressure, summation of forces, midpoint pressure, and force-width data.

15. The system of claim 1 wherein differences in the pattern of forces are used to indicate differences in the inflation pressure of tires.

16. The system of claim 8 wherein differences in the pattern of forces are used to indicate differences in the inflation pressure of tires.

* * * * *